(12) United States Patent
Kido

(10) Patent No.: US 6,249,811 B1
(45) Date of Patent: Jun. 19, 2001

(54) METHOD OF ESTABLISHING A SESSION BETWEEN TERMINALS ON A NETWORK, REMOTE TERMINAL AND RECORDING MEDIUM

(75) Inventor: Akio Kido, Tokyo (JP)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/040,586

(22) Filed: Mar. 18, 1998

(30) Foreign Application Priority Data

Apr. 23, 1997 (JP) .................................................... 9-106013

(51) Int. Cl.[7] .................................................... G06F 15/16
(52) U.S. Cl. ............................................ 709/219; 709/221
(58) Field of Search .................................... 709/200, 209, 709/204, 217, 219, 227; 370/431

(56) References Cited

U.S. PATENT DOCUMENTS

| | | | |
|---|---|---|---|
| 5,426,427 | * | 6/1995 | Chinnock et al. .................... 340/827 |
| 5,694,549 | * | 12/1997 | Carlin et al. ....................... 395/200.2 |
| 5,742,762 | * | 4/1998 | Scholl et al. ....................... 395/200.3 |
| 5,809,415 | * | 9/1998 | Rossman ............................. 455/422 |
| 5,838,682 | * | 11/1998 | Dekelbaum et al. ................. 370/401 |

OTHER PUBLICATIONS

W.Richard Stevens, TCP/IP Illustrated vol. 1: the Protocols. Addison–Wesley Professional Computing Series, 1994.*

* cited by examiner

*Primary Examiner*—Dung C. Dinh
*Assistant Examiner*—Tod Kupstas
(74) *Attorney, Agent, or Firm*—Jeanine S. Ray-Yarletts; Myers, Bigel, Sibley & Sajovec, P.A.

(57) ABSTRACT

The present invention establishes a TCP/IP session between terminals which connect to a network on-demand by a dial up PPP. This is achieved by connecting from a local terminal X to a local connection point A of the network by a dial up PPP, calling a remote terminal Y from a secondary server C on the network based on information from the local terminal X and sending a FAX message containing an IP address of the local terminal X, and connecting the remote terminal Y to the network by a dial up PPP by a daemon on the remote terminal Y which is started based on the transmitted FAX message to send the IP address of the remote terminal to the local terminal.

12 Claims, 3 Drawing Sheets

METHOD OF ESTABLISHING A SESSION BETWEEN TERMINALS ON A NETWORK, REMOTE TERMINAL AND RECORDING MEDIUM

BACKGROUND OF THE INVENTION

This invention relates to a method of establishing a session between terminals utilizing a network which allows resources of remote terminals to be utilized, a remote terminal and a recording medium.

With recent popularization of internet, the internet connection function has been installed as a standard on an OS for a workstation and a PC (personal computer) such as OS/2 of IBM and Windows of Microsoft. On the other hand, the protocol which consumers and small scale users utilize in connecting to the internet is a terminal type dial up called PPP in which a terminal can not be connected to the internet unless a phone call is made from the terminal to the connection point of a network provider.

It is therefore necessary for a terminal to which a session is established to stay in a state in which it is connected to the network in order to establish a session from a terminal connected to the internet to another terminal via the internet. In other words, only the terminal placed in front of a user can dynamically connect to or disconnect from the network on demand and, for example, a resource of a PC system placed in home can not be utilized from a terminal which a consumer carries along as a mobile unit.

In view of recent popularization of PCs and an environment in which each person fully makes use of a plurality of mobile and desk top systems, it is considered that a demand of using resources of a remote desk top system from a mobile system is going to increase. As an alternative of the above, it could be conceivable to have a remote system stay always in connection to the network through a leased line or to call a modem of the remote terminal from a modem of the mobile terminal. However, the former would result in an expensive fee to be paid to a network provider so that it fails to meet consumers requirement while, in the latter, the telephone fee to be paid to the network provider such as NTT (Nippon Telephone and Telegraph) depends on the distance so that a long distance communication would invite an increase of a communication cost.

It is therefore a purpose of this invention to provide a method of establishing a session between terminals utilizing a network, a remote terminal, a local terminal and a recording medium which resolve the above described problems.

SUMMARY OF THE INVENTION

To achieve the above objectives, an aspect of this invention is characterized by; connecting from a local terminal having a remote terminal connection information to a first access point existing on a network to receive a local terminal identification information, calling a remote terminal from a server existing on said network based on said remote terminal identification information to send information including said local terminal identification information to said remote terminal, connecting to a second access point existing on said network by a daemon on said remote terminal which is started based on said transmitted information to receive the remote terminal identification information, and transmitting the received remote terminal identification information to the local terminal based on said local terminal identification information.

In the above, the information from said local terminal may include information including said local terminal identification information, authentication information for utilizing the function of said server and authentication information for utilizing the daemon function on said remote terminal.

Further, the daemon on said remote terminal can be started by detecting that the transmitted information including the local terminal identification information is abnormally short.

Further, connection of said remote terminal to said network can be maintained by said daemon while a connection maintenance instruction is periodically transmitted from said local terminal through said network after said remote terminal identification information has been transmitted to said local terminal.

Another aspect of this invention is characterized by the provision of; means for detecting whether or not the information including a local terminal identification information transmitted over a network matches a predetermined condition, and session establishing means started upon detecting that the information including a local terminal identification information matches a predetermined condition for executing a connection to an access point existing on said network to receive a remote terminal identification information and sending the received remote terminal identification information to a local terminal based on said local terminal identification information.

In the above, said session establishing means can maintain the connection to said network while the connection maintenance instructions are periodically transmitted over said network after said session establishing means has sent out said remote terminal identification information.

A further aspect of this invention is characterized by a recording medium which records therein a control program for establishing a session between terminals utilizing a network, said control program causing a computer to detect whether or not the information including a local terminal identification information transmitted over a network matches a predetermined condition, and to establish a connection to an access point existing on said network upon detecting that the information including a local terminal identification information matches a predetermined condition and to send the remote terminal identification information received from said access point to a local terminal based on said local terminal identification information.

In the above, said control program can cause the computer to maintain the connection to said network while a connection maintenance instruction is periodically transmitted through said network after said remote terminal identification information has been sent out.

A further aspect of this invention is characterized by the provision of; means for executing connection to an access point existing on a network, means for receiving a local terminal identification information from the connected access point, and means for sending out information including the received local terminal identification information and remote terminal identification information to said remote terminal over the network.

A further aspect of this invention is characterized by a recording medium which records therein a control program for establishing a session between terminals utilizing a network, said control program causing a computer to establish connection to an access point existing on a network, to receive local terminal identification information from said connected access point, and send out information including the received local terminal identification information and remote terminal identification information to said remote terminal over the network.

DETAILED DESCRIPTION OF THE PREFERRED EMBODIMENT

Figure 1:
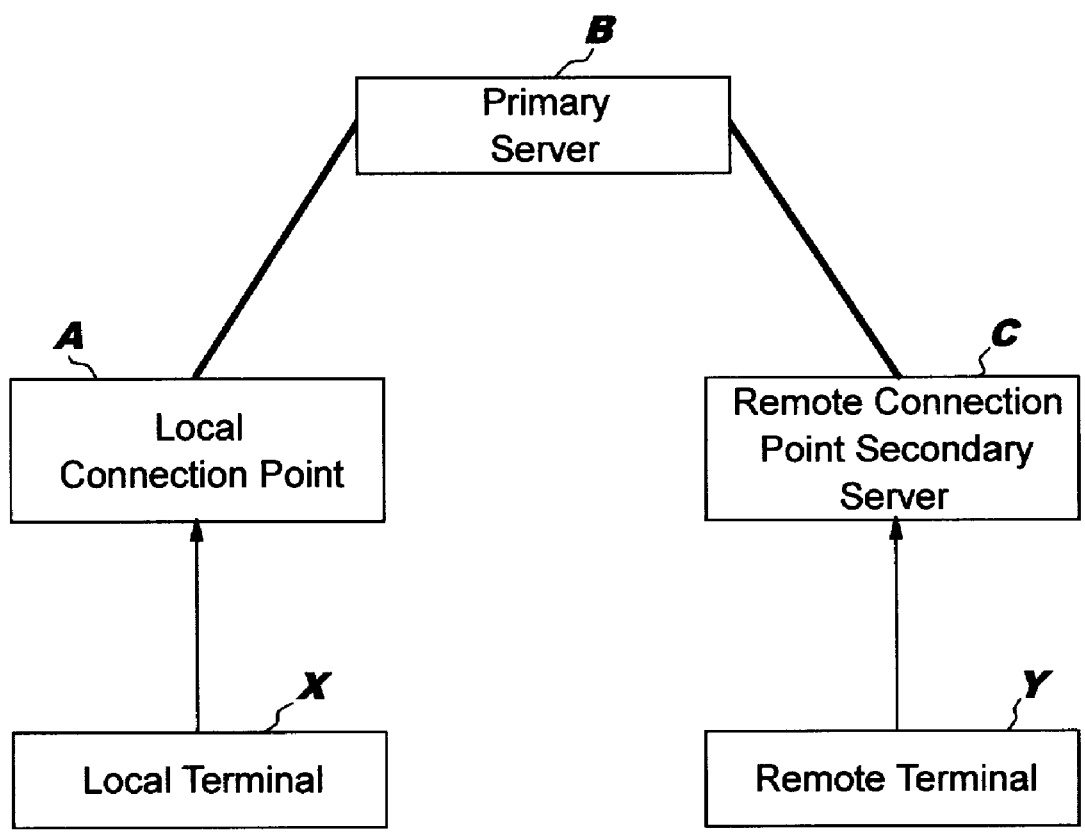
FIG. 1 is a diagram of a possible configuration for the present invention.

The present invention will now be described in further detail with reference to the figures. FIG. 1 is a diagram showing a mode of practicing this invention. In the figure, X is a local terminal, Y is a remote terminal, and A is a local connection point which is a provider on the internet for the local terminal X to connect through a telephone line. B is an on-demand connection primary server operating on the internet and C is an on-demand connection secondary server operating on the internet and is also a remote connection point for the remote terminal Y.

Figure 2:
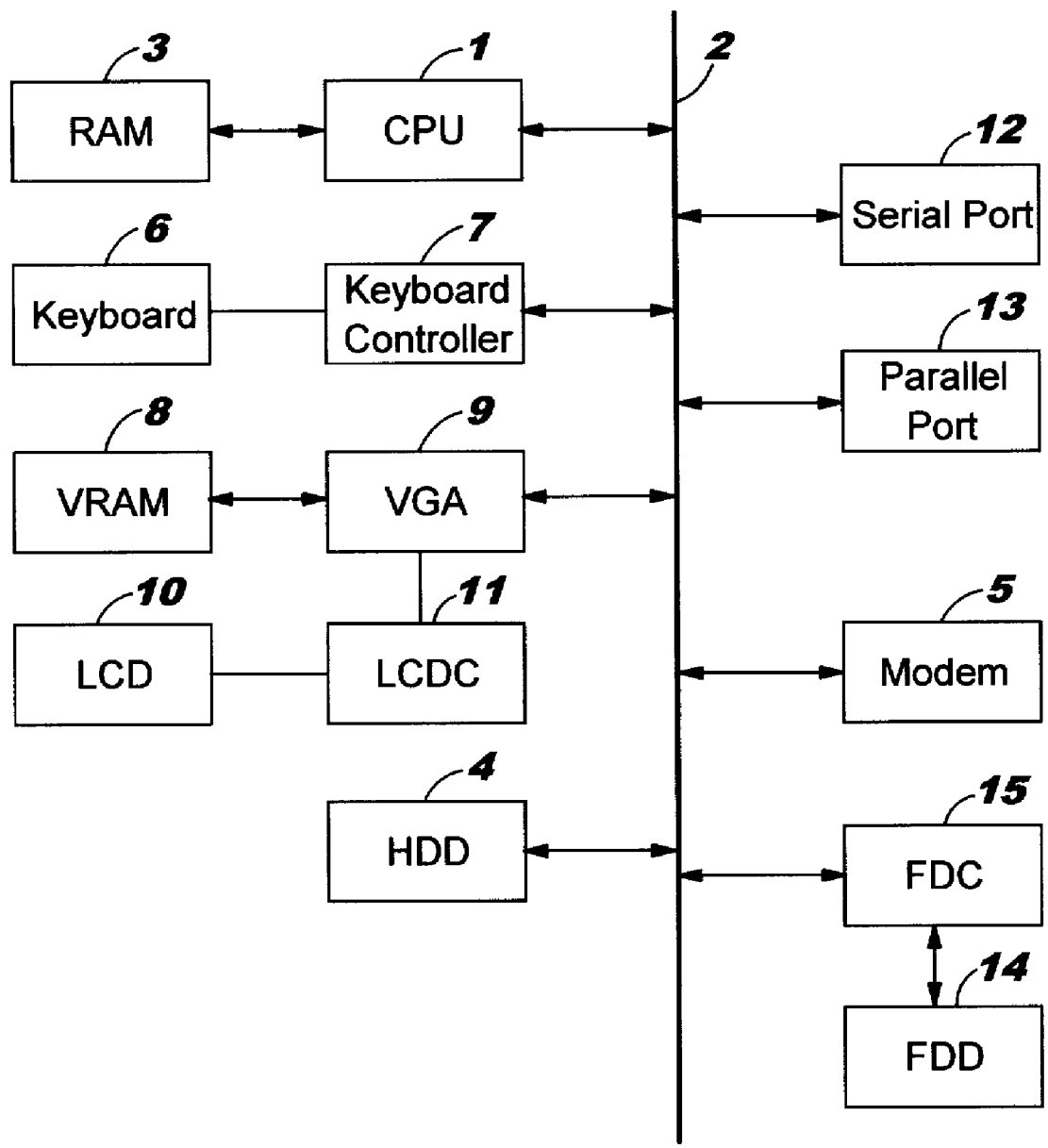
FIG. 2 is a diagram of a configuration for a remote terminal.

While the local terminal X is assumed to be, for example, a so called portable mobile PC as shown in FIG. 2, it may be in other forms such as a workstation and PC, i.e., a so called desk top PC so long as it has a modem which has a capability of communication by connecting to a portable telephone, PHS and a public telephone, etc. As shown in FIG. 2, a CPU 1 provides processing for all of the exemplified components which are connected each other via a bus 2. Item 3 is a RAM which is a main memory and used for the work of the CPU 1 and for loading an OS and an application program, etc. Item 4 is a hard disk device which is an auxiliary storage and normally stores therein a software program including a control procedure to be described later. Item 5 is a modem which connects to a telephone line. Item 6 is a keyboard, item 7 is a keyboard controller, item 8 is a video RAM, item 9 is a video graphic array (VGA), item 10 is a liquid crystal display device, item 11 is a controller of the liquid crystal display device, item 12 is a serial port, item 13 is a parallel port, item 14 is a floppy disk device and item 15 is a controller of the floppy disk device. This is exemplary of the device upon which the present invention may be implemented. The components are not described in detail because they are conventional components.

Figure 3:
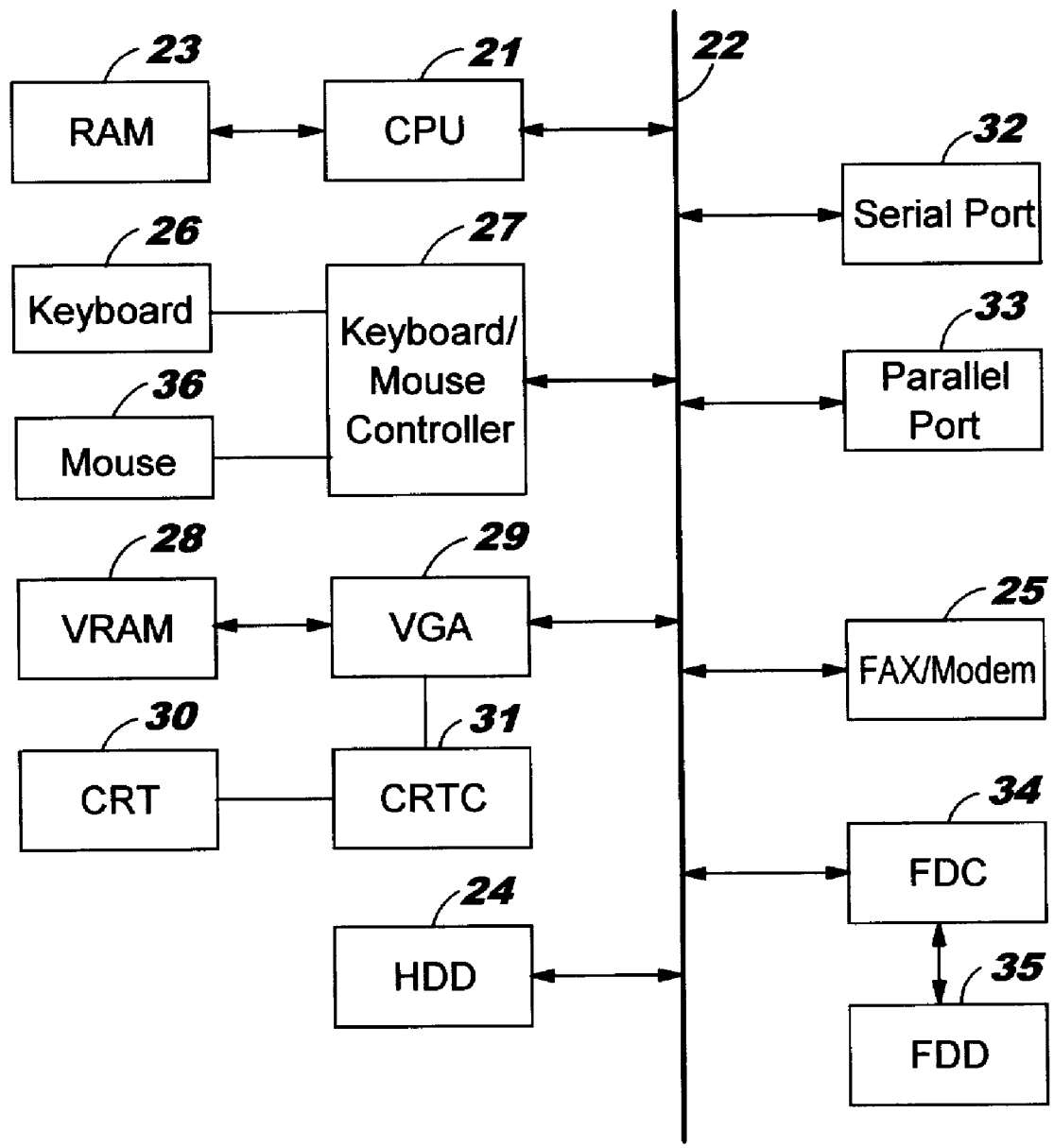
FIG. 3 is a diagram of a configuration for a local terminal.

The remote terminal Y is assumed to be a conventional workstation or PC as shown in FIG. 3 provided that it has a FAX modem which has a capability of communication when it is connected to a telephone line. As shown in FIG. 3, the basic configuration is the same as in FIG. 2 except that it includes a mouse 36 beside the keyboard 26 as a user interface. The mouse 36 and keyboard 26 are connected to a bus 22 via a keyboard mouse controller 27. Further, a CRT 30 is connected to a VGA 29 via a controller 31 as a display means in place of an LCD. Item 25 is a modem with FAX function and is connected to a telephone line.

The local terminal X and the remote terminal Y have a dial up PPP driver X1 or Y1 in the storage device (normally, a hard disk device) which is provided in each of the terminals and a daemon X2 or Y2 which establishes and monitors a session between the terminals. The remote terminal Y has a FAX reception software program which has a hook Y3 having a function to start the daemon Y2.

A memory means within a computer of the primary server B and the secondary server C stores therein a software program which has information for executing a control (processing) procedure to be described later needed by each system.

The procedure from establishing a session to disconnection is now described in further detail.

The dial up PPP driver X1 is started by a conventional method from the local user's terminal to call a local connection point A which is nearest the local terminal and complete connection of the dial up PPP. In this step, the local terminal X is connected to the internet. An IP address for the local terminal X is dynamically allocated by the local connection point A and is delivered to the local terminal X thereby enabling the communication from the local terminal X to the remote connection point C.

The user then starts the session establishing/monitoring daemon X2 on the local terminal X and issues a request to the server B which exists someplace in the network to connect to the remote terminal Y which is connected to a telephone number given by a parameter. The parameter will include authentication information for utilizing the function of the primary server B, authentication information for utilizing the function of the session establishing/monitoring daemon Y2 on the remote terminal Y and the IP address of the local terminal X which was dynamically allocated.

Next, the primary server B checks the authentication information for utilizing the function of the primary server B which was notified from the session establishing/monitoring daemon X2 and, if the information is valid, finds a remote connection point nearest the remote terminal Y using the telephone number of the remote terminal Y which was similarly notified from the session establishing/monitoring daemon X2. The primary server B then issues a request to the secondary server C on the remote connection point to connect to the remote terminal Y. The primary server B then delivers the telephone number of the remote terminal Y, the authentication information for utilizing the function of the session establishing/monitoring daemon Y2 and the IP address of the local terminal X to the secondary server C on the remote connection point.

The secondary server C on the remote connection point then calls the FAX modem of the remote terminal using the FAX function and delivers a very short FAX message to the FAX reception software program on the remote terminal Y. Contained in this FAX message are the authentication information for utilizing the function of the session establishing/monitoring daemon Y2 and the IP address of the local terminal X in a coded form.

The remote terminal Y may then be in a sleeping state if it has an on-demand wake up facsimile reception function which is mounted on an Aptiva (trademark of IBM). In addition, because this is a communication utilizing FAX, the remote terminal Y receives without ringing so that this will not be mixed up with a normal telephone call.

The FAX reception software program on the remote terminal Y detects that the regularly delivered FAX message is abnormally short for a normal FAX message and starts the session establishing/monitoring daemon Y2 on the remote terminal Y. This function is a hook which is indispensable to the FAX software. The received FAX message is delivered to the session establishing/monitoring daemon Y2 through a conventional spool of the FAX software.

The session establishing/monitoring daemon Y2 decodes the delivered FAX message to check whether or not the authentication information for utilizing the session establishing/monitoring daemon Y2 is correctly stored. If authentication is successful, the following steps of processing follow.

The session establishing/monitoring daemon Y2 starts the dial up PPP driver Y1 on the remote terminal Y and tries to establish a PPP connection with the remote connection point which is near the remote terminal (in this case, the remote connection point of the secondary server) according to a method which is registered in advance.

If the PPP connection is made successfully, the remote terminal Y will be connected to the internet for the first time then. Its IP address is dynamically allocated and delivered by the access point, also. At this point of time, while the communication from the local terminal X to the remote terminal Y is in a feasible condition from a network point of view, the session can not be completed to the remote terminal because the user of the local terminal X does not know the IP address allocated to the remote terminal Y.

The session establishing/monitoring daemon Y2 finds the IP address of the local terminal X from the information in the delivered FAX message and notifies the session establishing/monitoring daemon Y2 of the fact that the remote terminal Y has been connected to the network. The IP address of the remote terminal Y will be contained in the notification message. A timer is also activated to monitor whether or not a message which instructs the session establishing/monitoring daemon Y2 to maintain connection arrives periodically from the session establishing/monitoring daemon X2. So long as the connection maintenance instruction continues to arrive from the session establishing/monitoring daemon X2, the remote terminal Y also notifies the session establishing/monitoring daemon X2 of continued connection to the network by returning a reply to the session establishing/monitoring daemon X2.

When the session establishing/monitoring daemon X2 is notified of connection of the remote terminal Y to the network from the session establishing/monitoring daemon Y2, it notifies the user of the IP address in the message.

At this point of time, the user finds the IP address of the remote terminal Y and becomes able to complete a session with the remote terminal Y and access to resources of the remote terminal Y.

The session establishing/monitoring daemon X2 continues to send a connection maintenance instruction to the session establishing/monitoring daemon Y2 unless the user requests to disconnect the remote terminal Y from the network. The session establishing/monitoring daemon X2 also monitors replies from the session establishing/monitoring daemon Y2. When the reply does not arrive in a given time period from the session establishing/monitoring daemon Y2, the session establishing/monitoring daemon X2 notifies the user that the session establishing/monitoring daemon Y2 is disconnected from the network by some reason and goes to a sleeping state.

When the user requests to disconnect the remote terminal Y from the network, the session establishing/monitoring daemon X2 finally sends a disconnection request to the session establishing/monitoring daemon Y2 and then is terminated.

When the session establishing/monitoring daemon Y2 receives that a disconnection request from the session establishing/monitoring daemon X2 or a connection maintenance instruction from the session establishing/monitoring daemon does not arrive in a given time period, it determines that a connection of the remote terminal to the network is no longer needed. The session establishing/monitoring daemon Y2 then issues an instruction to the dial up PPP driver or the OS to disconnect the PPP connection and has the modem disconnect the telephone. Thereafter, the session establishing/monitoring daemon Y2 is also terminated.

By the above procedure, the remote terminal Y will continue to maintain connection to the network only when both the session establishing/monitoring daemon X2 and the session establishing/monitoring daemon Y2 are in an active state. The user controls the remote terminal Y to have it connect to or disconnect from the network by activating or deactivating the session establishing/monitoring daemon X2 in the local terminal X side. The security in utilizing the resource of the remote terminal Y is doubly assured by the authentication in the primary server as well as the authentication in the session establishing/monitoring daemon Y2 on the remote terminal Y. In addition, because the connection request from the secondary server C which is a remote connection point to the remote terminal Y is embedded in the FAX message, it is less susceptible to decoding than a communication based on a normal character information.

As described in the above, a TCP/IP session can be established between terminals which connect to the network on-demand by the dial up PPP according to this invention. By this, the user can utilize resources of a system which is not always connected to the network (e.g., a home PC and an intranet server of a small scale enterprise). Further, a session can be established while assuring a security.

What is claimed is:

1. A method of establishing a session between terminals utilizing a network comprising the steps of:

connecting from a local terminal having information for connecting to a remote terminal to a first access point existing on said network;

transmitting session identification information to a first server on the network through the connection to the first access point to request establishing a session between the local terminal and the remote terminal;

transmitting the session identification information to a second server existing on the network, wherein the second server is associated with the remote terminal;

calling said remote terminal from the second server existing on said network based on said session identification information so as to establish a connection from the second server to the remote terminal outside of the network;

transmitting local terminal information to the remote terminal over the connection outside the network;

connecting from the remote terminal to a second access point existing on said network by a daemon on said remote terminal which is started based on said transmitted information from the second server; and transmitting remote terminal identification information from the remote terminal to the local terminal based on the local terminal information so as to allow a session to be established between the local terminal and the remote terminal.

2. A method of claim 1 in which the session identification information includes authentication information for utilizing the function of said first server and authentication information for utilizing the daemon function on said remote terminal.

3. A method of claim 1 in which connection of said remote terminal to said network is maintained by said daemon while a connection maintenance instruction is periodically transmitted from said local terminal through said network after said remote terminal identification information has been transmitted to said local terminal.

4. A method according to claim 1, wherein the connection from the second server to the remote terminal is a facsimile connection.

5. A system for establishing a session between terminals utilizing a network comprising the steps of:

means for connecting from a local terminal having information for connecting to a remote terminal to a first access point existing on said network;

means for transmitting session identification information to a first server on the network through the connection to the first access point to request establishing a session between the local terminal and the remote terminal;

means for transmitting the session identification information to a second server existing on the network, wherein the second server is associated with the remote terminal;

means for calling said remote terminal from the second server existing on said network based on said session identification information so as to establish a connection from the second server to the remote terminal outside of the network;

means for transmitting local terminal information to the remote terminal over the connection outside the network;

means for connecting from the remote terminal to a second access point existing on said network by a daemon on said remote terminal which is started based on said transmitted information from the second server; and means for transmitting remote terminal identification information from the remote terminal to the local terminal based on the local terminal information so as to allow a session to be established between the local terminal and the remote terminal.

6. A system according to claim 5 in which the session identification information includes authentication information for utilizing the function of said first server and authentication information for utilizing the daemon function on said remote terminal.

7. A system according to claim 5 in which connection of said remote terminal to said network is maintained by said daemon while a connection maintenance instruction is periodically transmitted from said local terminal through said network after said remote terminal identification information has been transmitted to said local terminal.

8. A system according to claim 5, wherein the connection from the second server to the remote terminal is a facsimile connection.

9. A computer program product recorded in a computer readable media for establishing a session between terminals utilizing a network comprising:

computer program code which connects from a local terminal having information for connecting to a remote terminal to a first access point existing on said network;

computer program code which transmits session identification information to a first server on the network through the connection to the first access point to reqtiest establishing a session between the local terminal and the remote terminal;

computer program code which transmits the session identification information to a second server existing on the network, wherein the second server is associated with the remote terminal;

computer program code which calls said remote terminal from the second server existing on said network based on said session identification information so as to establish a connection from the second server to the remote terminal outside of the network;

computer program code which transmits local terminal information to the remote terminal over the connection outside the network;

computer program code which connects from the remote terminal to a second access point existing on said network by a daemon on said remote terminal which is started based on said transmitted information from the second server; and computer program code which transmits remote terminal identification information from the remote terminal to the local terminal based on the local terminal information so as to allow a session to be established between the local terminal and the remote terminal.

10. A computer program product according to claim 9 in which the session identification information includes authentication information for utilizing the function of said first server and authentication information for utilizing the daemon function on said remote terminal.

11. A computer program product according to claim 9 in which connection of said remote terminal to said network is maintained by said daemon while a connection maintenance instruction is periodically transmitted from said local terminal through said network after said remote terminal identification information has been transmitted to said local terminal.

12. A computer program product according to claim 9, wherein the connection from the second server to the remote terminal is a facsimile connection.

* * * * *